United States Patent [19]

Bargain

[11] 4,039,628
[45] Aug. 2, 1977

[54] HEAT-STABLE POLYIMIDE RESINS
[75] Inventor: Michel Bargain, Lyon, France
[73] Assignee: Rhone-Poulenc S.A., Paris, France
[21] Appl. No.: 687,225
[22] Filed: May 17, 1976

Related U.S. Application Data
[62] Division of Ser. No. 228,233, Feb. 22, 1972, Pat. No. 3,998,787.

[30] Foreign Application Priority Data
Feb. 24, 1971   France .................. 71.06288

[51] Int. Cl.² .............. C08L 77/06; C08G 69/26
[52] U.S. Cl. .................. 260/857 UN; 260/47 CZ; 260/65; 260/78 UA
[58] Field of Search ....... 260/78 UA, 47 UA, 47 CZ, 260/65, 857 UN

[56] References Cited
U.S. PATENT DOCUMENTS

| | | | |
|---|---|---|---|
| 3,562,223 | 2/1971 | Bargain et al. | 260/78 UA |
| 3,652,511 | 3/1972 | Vincent et al. | 260/78 UA |
| 3,679,639 | 7/1972 | Bargain et al. | 260/78 UA |

Primary Examiner—Harold D. Anderson
Attorney, Agent, or Firm—Stevens, Davis, Miller & Mosher

[57] ABSTRACT

New heat-stable resins are provided having good mechanical and electrical properties combined with chemical inertness at temperatures of 200° to 300° C, which resins comprise three-dimensional recurring units of the general formula:

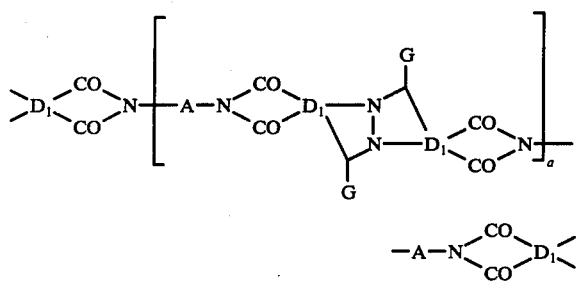

in which, in any particular recurring unit:
$a$ is zero or an integer from 1 to 5;

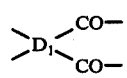

denotes a radical of the general formula

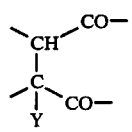

in which Y represents H, CH₃ or Cl;

G denotes a monovalent aromatic radical; and
A denotes a divalent organic radical possessing at least two carbon atoms, such that there are on average, at least 4.4 and at most about

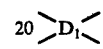

radicals per

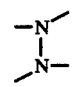

radical, and optionally, units and/or molecules of the general formula

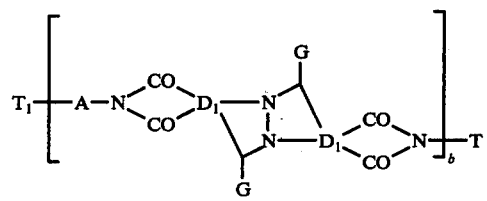

in which:
T denotes a monovalent organic radical;
T₁ denotes a radical of the general formula:

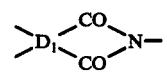

or a radical of the general formula:

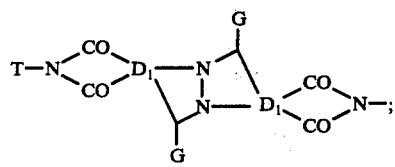

$b$ is zero or an integer from 1 to 4;
and A, D₁ and G are as defined in claim 1; such that there are at most about 30

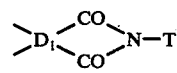

radicals per 100

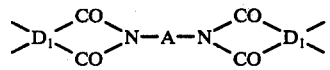

radicals.

18 Claims, No Drawings

HEAT-STABLE POLYIMIDE RESINS

This is a division of application Ser. No. 228,233 filed Feb. 22, 1972, now U.S. Pat. No. 3,998,787.

The present invention relates to new heat-stable resins based on three-dimensional polyimides.

Three dimensional polyimides prepared by heating N,N-bis-imides of unsaturated dicarboxylic acids (see French Pat. No. 1,455,514) or by cyclising-dehydration and crosslinking of polyamide-acids, the ends of the chains of which are blocked by an unsaturated dicarboxylic acid (see French Pat. No. 1,537,135) have already been described.

Furthermore linear polymers blocked by maleimido groups, wherein the recurring unit has the formula:

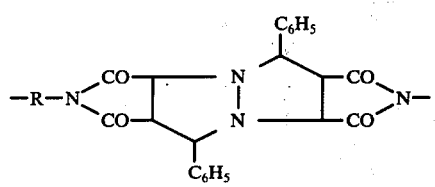

in which R represents a phenylene or hexamethylene radical, are known [see Stille and Anyos J. Polym. Sci. A. vol. 2, p. 1487 (1964)]. These polymers have been obtained by heating the corresponding bis-maleimide with benzalazine, the reactants being used in stoichiometric amounts or with a molar excess of bis-maleimide; the crude polymer is thereafter freed of residual monomers by washing with chloroform and acetone. The authors also indicate that the viscosity of the crude polymers decreases during prolonged heating above 200° C and regard this result as the consequence of a depolymerisation taking place.

The present invention provides a new heat-stable resin which is based on three-dimensional polyimides and which comprises three-dimensional recurring units of the general formula:

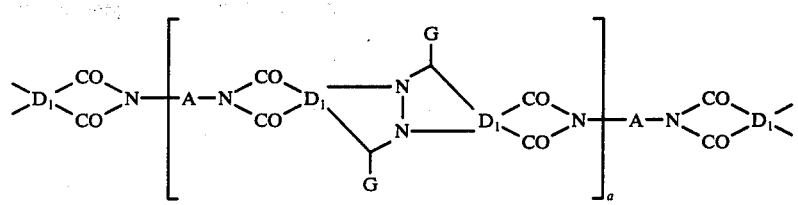

in which, in any particular recurring unit:
a is zero or an integer from 1 to 5;

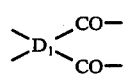

denotes a radical of the general formula

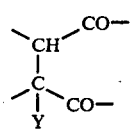

in which Y represents H, $CH_3$ or Cl;

G denotes a monovalent aromatic radical; and
A denotes a divalent organic radical possessing at least two carbon atoms, such that there are on average, at least 4.4 and at most about

radicals per

radical.

The resins of this invention can also contain units and/or molecules of the general formula:

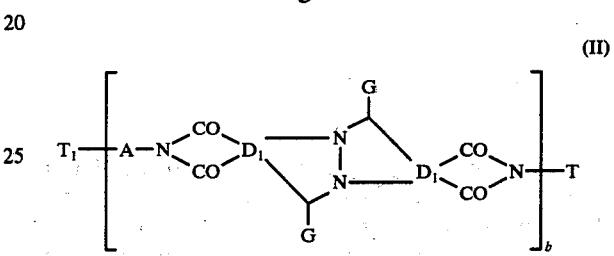

in which:
T denotes a monovalent organic radical
$T_1$ denotes a radical

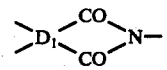

or a radical

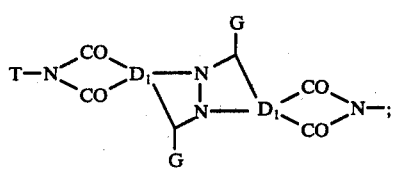

b is zero or an integer from 1 to 4;
and A, $D_1$ and G are as defined above.

The resins which contain units and/or molecules of the formula (II) furthermore contain at most about 30 radicals

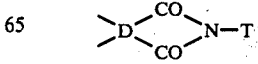

per 100 radicals

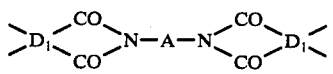

In the formulae given above, the symbol A can denote, for example, an alkylene radical having less than 13 carbon atoms, a phenylene or cyclohexylene radical or one of the radicals of the formulae:

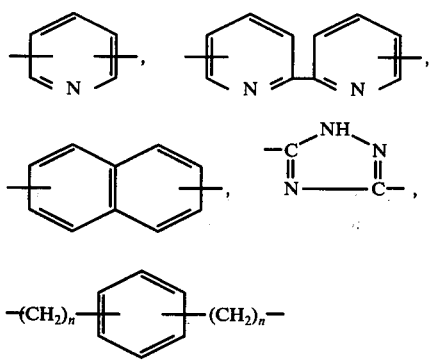

wherein $n$ represents an integer from 1 to 3, a divalent radical having 12 to 30 carbon atoms consisting of phenylene or cyclohexylene radicals linked to one another by a simple valency bond or by an inert atom or group such as —O— or —S—, an alkylene group with 1 to 3 carbon atoms, —CO—, —SO$_2$—, —NR$_1$—, —N=N—, —CONH—, —COO —, —P(O)R$_1$—, —CONH—X- —NHCO—,

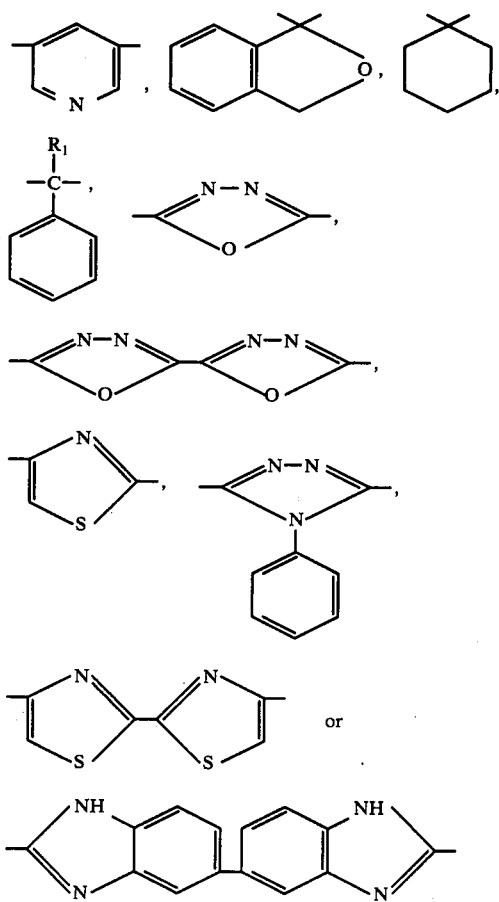

wherein $R_1$ represents a hydrogen atom, an alkyl radical with 1 to 4 carbon atoms, a phenyl radical or a cyclohexyl radical and X represents an alkylene radical with less than 13 carbon atoms. Furthermore, the various phenylene or cyclohexylene radicals can be substituted by methyl groups.

The symbol G can represent for example, a phenyl radical optionally substituted by inert atoms, radicals or groups such as Cl, F, CH$_3$, OCH$_3$ and NO$_2$.

The symbol T can represent for example, an alkyl radical with 1 to 18 carbon atoms, a phenyl or cyclohexyl radical or

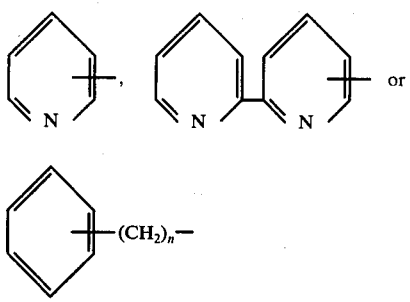

wherein $n$ is as defined above, or a monovalent radical consisting of a phenyl radical and a phenylene radical linked to one another by a simple valency bond or by an inert atom or group as —O—, —S—, an alkylene radical with 1 to 3 carbon atoms, —CO—, —SO—, —NR—, —N=N—, —CONH— or —COO—, wherein $R_1$ is as defined above. Furthermore, the rings belonging to these various radicals can be substituted by inert atoms, radicals or groups such as F, Cl, CH$_3$, OCH$_3$ and NO$_2$.

The resins consisting of units (I) can be prepared by heating, at between 50° C and 350° C, a mixture comprising: and aldehyde-azine of the general formula:

$$G - CH = N - N = CH - G \qquad (III)$$

(hereafter referred to as an alazine), in which G is as defined above, and a bis-imide of the general formula:

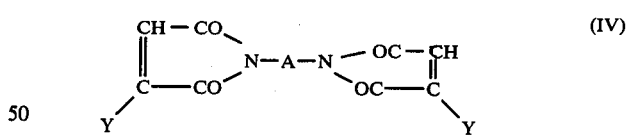

in which A and Y are as defined above, in such amounts that on average at least 2.2 and at most 10 mols of bis-imide (IV) are present per mol of alazine.

The preparation of the resins which also contain units or molecules of formula (II) can be effected by heating, at between 50° C and 350° C, a mixture which in addition to containing the alazine of formula (III) and the bis-imide of formula (IV), in the proportions indicated above, contains a mono-imide of the general formula:

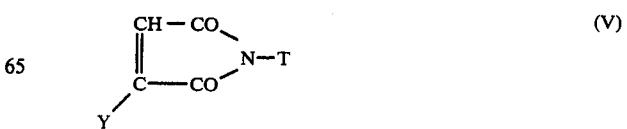

in which Y and T are as defined above, in such amounts that at most 30 mols of mono-imide (V) are present per 100 mols of bis-imide (IV).

It is to be understood that a mixture of alazines of formula (III) can be used and that, *mutatis mutandis*, this remark equally applies to the imides of formulae (IV) and (V).

Amongst the alazines of formula (III) which can be used, there may be mentioned benzalazine, p-methoxybenzalazine, p-nitrobenzalazine and p-chlorobenzalazine.

Specific examples of bis-imides of formula (IV) include: N,N'-ethylene-bis-maleimide, N,N'-hexamethylene-bis-maleimide, N,N'-metaphenylene-bis-maleimide, N,N'-paraphenylene-bis-maleimide, N,N'-4,4'-biphenylylene-bis-maleimide, N,N'-4,4'-diphenylmethane-bis-maleimide, N,N'-4,4'-diphenylether-bis-maleimide, N,N'-4,4'-diphenylsulphone-bis-maleimide, N,N'-4,4'-dicyclohexylmethane-bis-maleimide, N,N'-α,α'-4,4'-dimethylene-cyclohexane-bis-maleimide, N,N'-meta-xylylene-bis-maleimide, N,N'-para-xylylene-bis-maleimide, N,N'-4,4'-(1,1-diphenylcyclohexane)-bis-maleimide, N,N'-4,4'-diphenylmethane-bis-citraconimide, N,N'-4,4'-diphenylmethane-bis-chloromaleimide, N,N'-4,4'-(1,1-diphenylpropane)-bis-maleimide, N,N'-4,4'-(1,1,1-triphenylethane)-bis-maleimide, N,N'-4,4'-triphenylmethane-bis-maleimide and N,N'-3,5-(1,2,4-triazole)-bis-maleimide. These bisimides can be prepared according to the methods described in U.S. Pat. No. 3,018,290 and British Pat. Specification No. 1,137,592 for example.

Specific examples of mono-imides of formula (V) which can be used include N-phenylmaleimide, N-phenylmethyl-maleimide, N-phenyl-chloromaleimide, N-p-chlorophenylmaleimide, N-p-methoxyphenylmaleimide, N-p-methylphenylmaleimide, N-p-nitrophenylmaleimide, N-p-phenoxyphenyl-maleimide, N-p-phenylaminophenylmaleimide, N-p-phenoxycarbonylphenylmaleimide and N-p-phenylcarbonylphenylmaleimide. These monoimides can be prepared by, for example, the method described in U.S. Pat. No. 2,444,536 for the preparation of N-arylmaleimides.

The preparation of the resins of this invention is advantageously carried out in two stages. In a first stage, a prepolymer (P) is prepared, which can then be shaped using it as a solution, a suspension, a powder or a liquid mass.

The prepolymers can be prepared in bulk by heating the mixture of the alazine, the bis-imide and, optionally, the monoimide, until a homogeneous liquid is obtained; in the following description, this mixture will be referred to as "the mixture of the reactants".

The temperature at which the preparation of the prepolymer is carried out can vary within rather wide limits depending on the nature and number of the reactants present, but it is generally between 80° and 180° C. It is advantageous to homogenise the mixture of the reactants beforehand if the reactants have a relatively high melting point.

The prepolymers can also be prepared by heating the reactants in a polar solvent such as dimethylformamide, N-methylpyrrolidone, dimethylacetamide, N-methylcaprolactam, diethylformamide and N-acetylpyrrolidone, at a temperature which is generally between 50° C and 180° C. The solutions of prepolymers can be used as such for numerous uses; it is also possible to isolate the prepolymer from its solution by precipitation with a diluent which is miscible with the polar solvent and does not dissolve the prepolymer, such as water or a hydrocarbon having a boiling point which does not significantly exceed 120° C.

The prepolymers can be used as a liquid mass and it is sufficient to shape them by casting whilst hot. It is also possible, to cool and grind them and then to use them in the form of powders which are remarkably suitable for compression moulding processes, optionally in the presence of fillers in the form of, for example, powders, spheres, granules, fibres or flakes. In the form of suspensions or solutions, the prepolymers can be used in the production of coatings and intermediate preimpregnated articles, the reinforcement consisting of, for example, fibrous materials consisting of aluminium or zirconium silicate or aluminium or zirconium oxide, carbon, graphite or boron, asbestos or glass.

In a second stage, the prepolymers can be cured by heating to temperatures of the order of 350° C, generally between 150° and 300° C; a supplementary shaping can be effected during curing, optionally in vacuo or under super-atmospheric pressure; these operations can also be consecutive. The curing can be effected in the presence of a radical polymerisation initiator such as lauroyl peroxide, azo-bis-isobutyronitrile or an anionic polymerisation catalyst such as diazabicyclooctane.

The resins of this invention can also contain, as an adjuvant, an aromatic compound (AR) containing from 2 to 4 benzene rings, which is not sublimable at atmospheric pressure up to 250° C and has a boiling point above 250° C; the addition of these aromatic compounds generally causes a lowering in the softening point of the prepolymers. In these aromatic compounds, the benzene rings can form condensed nuclei or can be bonded to one another by a valency bond or by an inert atom or group such as

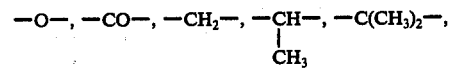

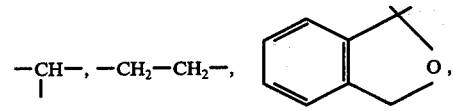

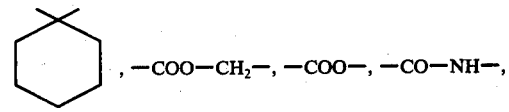

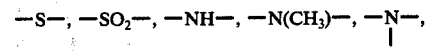

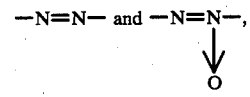

or a combination of these various types of linking can be present (in a single compound). The benzene rings can be substituted by inert radicals such as $-CH_3$, $-OCH_3$, $-F$, $-Cl$ and $-NO_2$. Examples include the isomeric terphenyls, the chlorinated diphenyls, phenyl ether, 2,2'-naphthyl ether, o-methoxylphenyl ether, benzophenone, 2,5,4'-trimethylbenzophenone, p-phenylbenzophenone, p-fluorobenzophenone, diphenylamine, diphenylmethylamine, triphenylamine, azobenzene, 4,4'-dimethylazobenzene, azoxybenzene, diphenylmethane, 1,1-diphenylethane, 1,1-diphenylpropane, triphenylmethane, diphenylsulphone, phenyl sulphide, 1,2-diphenylethane, p-diphenoxybenzene, 1,1-diphenylphthalane, 1,1-diphenylcyclohexane, phenyl benzoate, benzyl benzoate, p-nitrophenyl terephthalate and benzanilide. These aromatic adjuvants can be used in amounts of up to about 10% by weight relative to the weight of the prepolymer (P) or to the weight of the mixture of the reactants. According to an advantageous embodiment, the adjuvant (AR) is added to the prepolymer (P) or introduced into the mixture at any time during its preparation.

The resins of this invention can also be modified by the addition, before curing, of a monomer (M) other than an imide and containing at least one polymerisable —CH = C< group of the vinyl, maleic, allyl or acrylic type. The monomer can possess several —CH = C< groups provided the double bonds are not conjugated. In one and the same monomer, it is possible for more than one type to be present and it is also possible to use a mixture of copolymerisable monomers.

The monomers which can be used are generally esters, ethers, hydrocarbons, substituted heterocyclic derivatives, organo-motallic compounds or organometalloid compounds.

Suitable esters include the vinyl, allyl, methallyl, 1-chloroallyl, crotyl, isopropenyl and cinnamyl esters derived from saturated or unsaturated aliphatic or aromatic mono- or poly-carboxylic acids, such as formic, acetic propionic, butyric, oxalic, malonic, succinic, adipic sebacic, acrylic, methacrylic, phenylacrylic, crotonic, maleic, fumaric, itaconic, citraconic, tetrahydrophthalic, acetylene-dicarboxylic, benzoic, phenylacetic, orthophthalic, terephthalic and isophthalic acid, as well as the esters of non-polymerisable alcohols such as the methyl, isopropyl, 2-ethylhexyl and benzyl esters derived from polymerisable acids such as those mentioned above. Typical examples are vinyl acetate, allyl acetate, methyl acrylate and methacrylate, vinyl methacrylate, allyl maleate, allyl fumarate, allyl phthalate and allyl malonate.

Suitable ethers include vinyl allyl ether, allyl ether, methallyl ether, allyl crotyl ether and vinyl phenyl ether.

Amongst the substituted heterocyclic compounds, there may be mentioned the vinylpyridines, N-vinylpyrrolidone, N-vinylcarbazole, allyl isocyanurate, vinyltetrahydrofurane, vinyldibenzofurane, allyloxytetrahydrofurane and N-allylcaprolactam.

Hydrocarbons such as styrene, alpha-methylstyrene, p-chlorostyrene, vinylcyclohexane, 4-vinylcyclohexene, divinylcyclohexane, diallylbenzene and vinyltoluene can be used.

Suitable monomeric organometallic and organometalloid derivatives include those containing one or more atoms of phosphorus, boron or silicon. These can be silanes or siloxanes, phosphines, phosphine oxides or sulphides, phosphates, phosphites, phosphonates, boranes, orthoborates, boronates, boroxoles, borazoles and phosphazenes. Examples include vinyloxytrimethylsilane, 1,3-diallyl-tetramethyldisiloxane, allyldimethylphosphine oxide, allyl orthophosphate, allyl methylphosphonate, methyl paravinylphenylboronate, triallylborazole, triallylboroxole, triallytrichlorophosphazene, allyl phosphate and allyl allylphosphonate.

Furthermore, the monomers referred to above can contain halogen atoms, principally chlorine or fluorine, or functional groups such as an alcoholic or phenolic hydroxyl group, an aldehyde carbonyl group or an amido, epoxy or nitrile group. Examples of suitable monomers (M) which contain such substituents include allyloxyethanol, p-allyloxyphenol, tetraallylepoxyethane, glycidyl acrylate, glycidyl methacrylate, allyl glycidyl ether, 4-vinyl-epoxycyclohexane, p-cyanostyrene, acrylamide, N-methylacrylamide, N-allylacrylamide, N-methylolacrylamide, methyl vinyl ketone methyl allyl ketone, acrylonitrile, methylacrylonitrile, p-chlorostyrene and p-fluorostyrene.

The monomer (M) can be added to the prepolymer (P) or introduced into the mixture at any time during the preparation. The amount used is less than 50%, preferably 5 to 40%, of the weight of the prepolymer (P) or of the weight of the mixture of the reactants. The curing of the prepolymer modified with the monomer (M) can be effected under similar conditions to those which may be used for the curing of the unmodified prepolymer.

The resins of this invention can also be modified by the addition of an unsaturated polyester before curing. The unsaturated polyesters which can be used are well-known products. They are usually prepared by polycondensation of polycarboxylic derivatives and polyols, at least one containing olefinic unsaturation; by polycarboxylic derivatives there are meant acids, esters of lower alcohols, acid chlorides and, where appropriate, acid anhydrides. Preferred unsaturated polyesters are those derived from diacids or dianhydrides containing an olefinic double bond in the $\alpha,\beta$-position. By way of example, the polycarboxylic derivatives can be of the maleic, chloromaleic, itaconic citraconic, aconitic, pyrocinchonic, fumaric, chlorendic, endomethylene-tetrahydrophthalic, tetrahydrophthalic, ethylmaleic, succinic, sebacic, phthalic, isophthalic, adipic and hexahydrophthalic type. Amongst the polyols, the most commonly used are ethylene glycol, propylene glycol, diethylene glycol, triethylene glycol, neopentylglycol, tetraethylene glycol, butylene glycol, dipropylene glycol, glycerol, trimethylpropane, pentaerythritol, sorbitol and 3,3-bis(hydroxymethyl)-cyclohexene.

The term "unsaturated polyester" also covers solutions of the polycondensates described above in a monomer (M') which can copolymerise with them. These monomers are also well known in polyester technology; typical examples include styrene, alpha-methylstyrene, vinyltoluene, p-(alpha-methylvinyl)benzophenone, divinylbenzene, vinyl 2-chloroethyl ether, N-vinylpyrrolidone, 2-vinylpyridine, indene, methyl acrylate, methyl methacrylate, acrylamide, N-t-butylacrylamide, acrylonitrile, hexahydro-1,3,5-triacrylo-s-triazine,allyl phthalate, allyl fumarate, allyl cyanurate, allyl phosphate, diethylene glycol diallyl carbonate, allyl lactate, allyl malonate, allyl tricarballylate, allyl trimesate and allyl trimellate, If a monomer (M') is used, it generally represents from 10% to 60% of the weight of the solution of unsaturated polyester.

The unsaturated polyesters can be prepared in known manner; on this subject, reference may, for example, be made to KIRK-OTHMER: Encyclopaedia of Chemical Technology, 2nd edition, volume 20.

The details relating to the introduction and amounts of unsaturated polyester as well as to the curing to give resins are identical to those which have been described above in connection with monomer (M).

The incorporation of a monomer (M) or of an unsaturated polyester gives curable mixtures which can be used as impregnating resins; after addition of fillers, they can be used as coating compositions.

The resins according to the invention are of value in industries which require materials possessing good mechanical and electrical properties as well as high chemical inertness at temperatures of 200° C to 300° C. By way of example, they are suitable for the manufacture of insulating materials, in sheet or tube form, for electrical transformer, printed circuits, and self-lubricating gears, collars and supports.

The following Examples further illustrate the present invention.

EXAMPLE 1

107.3 g. of N,N'-4,4'-diphenylmethane-bis-maleimide and 20.83 g. of benzalazine are intimately mixed. The mixture is thereafter spread on a heated plate and kept in a heated chamber at 150° for 29 minutes. After cooling, the prepolymer is finely ground (particle diameter less than 100μ). A powder of softening point about 130° C is obtained.

25 g. of this powder are introduced into a cylindrical mould (diameter: 76 mm) which is placed between the platens of press which has beforehand been heated to 250° C. The whole is kept at this temperature for 1 hour under a pressure of 250 bars.

After release from the mould whilst hot, the article is subjected to a supplementary heat treatment at 250° C for 24 hours. After cooling, it has a flexural breaking strength of 10.3 kg/mm² at 25° C. After a heat test lasting 1,800 hours at 250° C, this strength is still 9.8 kg/mm².

EXAMPLE 2

83.25 g. of benzalazine are dissolved in 294 g. of dimethylformamide and the soluton is then heated to 130° C. 358 g. of N,N'-4,4'-diphenylmethane-bis-maleimide are then introduced and the whole is kept at 130° C for 2 hours 30 minutes. After cooling, the solution is introduced, over 5 minutes, into 1.2 l. of vigorously stirred water; the prepolymer precipitates and it is washed four times with 250 cm³ of water at 70° C. After drying at 60°/3mm Hg, 429 g. of a powder of softening point about 152° C are obtained.

25 g. of this powder are taken and moulded under the conditions described in Example 1. The moulded article has a flexural breaking strength of 12 kg/mm² at 25° C. After a heat test lasting 840 hours at 250° this strength is still 9.6 kg/mm².

EXAMPLE 3

108 g. of N,N'-4,4'-diphenyl-ether-bis-maleimide and 20.83 g of benzalazine are intimately mixed. The mixture is spread on a plate and the whole is kept at 160° C for 31 minutes and then at 200° C for 30 minutes. After cooling, the prepolymer is finely ground and 0.43 g. of diazabicyclooctane are then added to it.

12.5 g of this mixture are taken and 12.5 g. of short glass fibres (3 mm. length) are incorporated into it. Moulding is then carried out with this filled prepolymer under the conditions described in Example 1. The moulded article has a flexural breaking strength of 27.8 kg/mm² at 25° C. At 250° C, this strength is 18.3 kg/mm².

EXAMPLE 4

The experiment described in the preceding Example is repeated but using 80.4 g. of N,N'-4,4'-metaphenylene-bis-maleimide as the bis-imide, the prepolymer being obtained by heating the mixture at 160° C for 31 minutes.

The moulded article has a flexural breaking strength of 21.7 kg/mm² at 25° C. At 250° C, this strength is 19.5 kg/mm².

EXAMPLE 5

A prepolymer is prepared by heating an initmate mixture of 214.6 g of N,N'-4,4'-diphenylmethane-bis-maleimide and 47.5 g. of benzalazine at 150° C. for 19 minutes. The prepolymer is thereafter finely ground. 28 g. of the powder are taken and introduced into 34 g. of water, with vigorous stirring.

13.5 dm² of a satin type of glass fibre fabric, having a specific weight of 308 g/m², are impregnated with the suspension thus prepared; this fabric has previously been desized by heating and then treated with γ-aminopropyltriethoxysilane. The coated fabric is thereafter dried at 130° for 25 minutes at 500 mm/Hg. 12 square samples (10 cm × 10 cm) are cut from this pre-impregnated fabric and are stacked so as to alternate the weft and warp. The stack is thereafter placed between the platens of a press pre-heated to 250° C. A pressure of 40 bars is applied and the whole is then kept under these conditions for 30 minutes. During cooling, the laminate is released when the temperature reaches 150° C. This laminate contains 35.8% by weight of resin and has a flexural breaking strength of 38.6 kg/mm² at 250° C. After a heat test lasting 500 hours at 250° C, this strength is 39.4 kg/mm² (again measured at 250° C).

EXAMPLE 6

268.7 g of N,N'-4,4'-diphenylmethane-bis-maleimide and 52 g of benzalazine are intimately mixed. Three 63 g. samples are taken from this mixture and three compositions $C_1$, $C_2$ and $C_3$ are prepared therefrom by respectively adding to them:

7 g of terphenyl ($C_1$)

7 g of allyl phthalate ($C_2$)

7 g of an unsaturated polyester prepared by heating 46 kg of chlorendic acid, 13.7 g of maleic acid and 14.85 kg of ethylene glycol under nitrogen at 175° C for 12 hours ($C_3$).

Each of the compositions is heated to 150° C for 41 minutes; after cooling, compositions $C_1$ and $C_2$ are subjected to a supplementary heating, rising from 85° to 110° C, for 15 hours. After grinding, powders are obtained which are moulded under the conditions described in Example 1. The moulded articles respectively have a flexural breaking strength of 13, 11.4 and 13.5 kg/mm² at 25° C. After a heat exposure at 250° C, this strength assumes the following values:

9.1 kg/mm² for ($C_1$) after 1,000 hours.

7.9 kg/mm² for ($C_2$) after 1,490 hours.

8.5 kg/mm² for ($C_3$) after 1,000 hours.

EXAMPLE 7

The experiment described in Examples 1 is repeated, but starting from 35.8 kg of N,N'-4,4'-diphenylmethane-bis-malemide and 9.46 g of benzalazine; furthermore, moulding is carried out under 200 bars. The supplementary heat treatment is carried out at 250° C for 48 hours. After this treatment, the material has a flexural breaking strength of 9.9 kg/mm² at 25° C; at 250° C this strength is 5.5 kg/mm².

EXAMPLE 8

A prepolymer is prepared from a mixture which in addition to the two essential reactants used in the preceding Example contains 4 g of N-phenylmaleimide; the mixture is heated at 150° C for 25 minutes. After cooling, moulding and a supplementary heat treatment are carried out under the conditions described in Example 7. After a heat test lasting 170 minutes at 250° C, the loss in weight observed in a sample of the moulded article is less than 2.4%.

I claim:

1. A heat-stable cured resin which consists essentially of three-dimensional recurring units of the general formula:

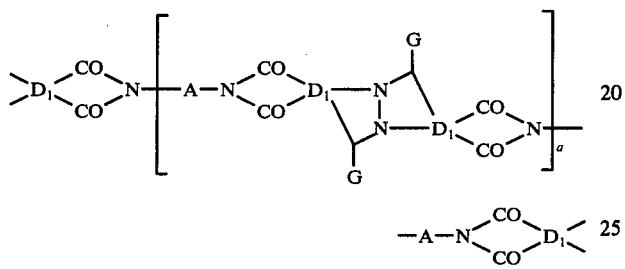

in which, in any particular recurring unit
a is zero or an integer from 1 to 5;

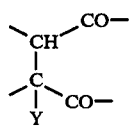

denotes a radical of the general formula:

in which Y represents H, $CH_3$ or Cl;
G denotes a monovalent carbocyclic aromatic radical; and
A denotes an alkylene radical having less than 13 carbon atoms, a phenylene or cyclohexylene radical or one of the radicals of the formula:

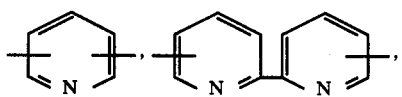

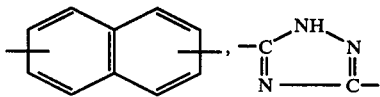

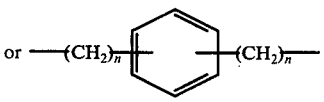

wherein $n$ represents an integer from 1 to 3, or a divalent radical having 12 to 30 carbon atoms consisting of phenylene or cyclohexylene radicals linked to one another by a simple valency bond or by —O— or —S—, and alkylene group with 1 to 3 carbon atoms, —CO—, —$SO_2$—, —$NR_1$—, —N=N—, —CONH—, —COO—, —P(O)$R_1$—, —CONH—X—NHCO—,

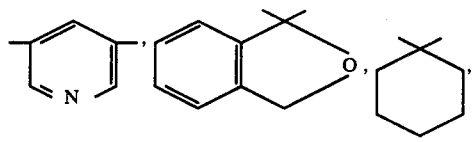

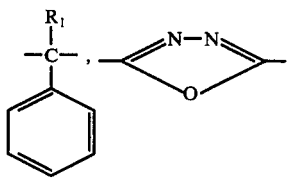

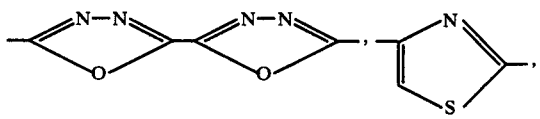

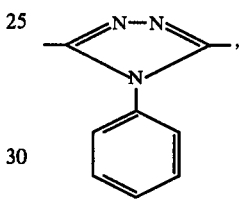

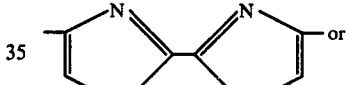

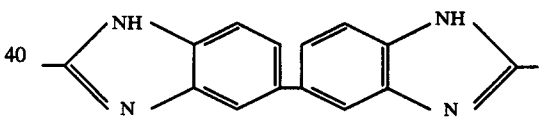

wherein $R_1$ represents a hydrogen atom, an alkyl radical with 1 to 4 carbon atoms, a phenyl radical or a cyclohexyl radical and X represents an alkylene radical with less than 13 carbon atoms, such that there are, on average, at least 4.4 and at most about 20 >$D_1$<
radicals per $$-N\begin{matrix}\\|\\N-\end{matrix}$$

radical which is modified by the addition, before curing of the resin, of a polymerisable monomer other than an imide, containing at least one vinyl, maleic, allyl or acrylic —CH=C< group, in an amount from 5% to 50% by weight based on the weight of the reactants.

2. The resin according to claim 1 which also contains units and/or molecules of the general formula:

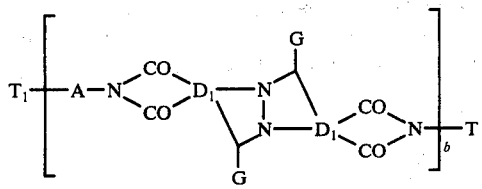

in which:
T denotes a monovalent organic radical;
$T_1$ denotes a radical of the general formula:

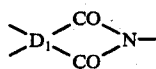

or a radical of the general formula:

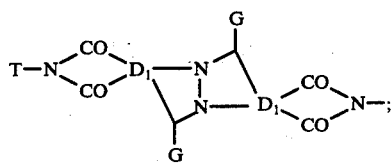

b is zero or an integer from 1 to 4; and A, $D_1$ and G are as defined in claim 21; such that there are at most about 30

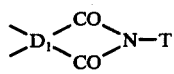

radicals per 100

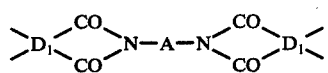

radicals.

3. The resin according to claim 1 in which A denotes an alkylene radical having less than 13 carbon atoms, a phenylene or cyclohexylene radical or one of the radicals of the formulae:

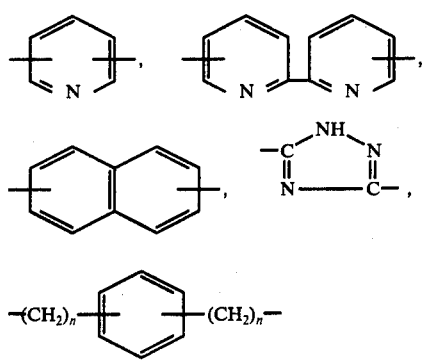

wherein $n$ represents an integer from 1 to 3, a divalent radical having 12 to 30 carbon atoms consisting of phenylene or cyclohexylene radicals linked to one another by a simple valency bond or by an inert atom or group —O— or —S—, an alkylene group with 1 to 3 carbon atoms, —CO—, —$SO_2$—, —$NR_1$—, —N=N—, —CONH—, —COO—, —P(O)$R_1$—, —CONH—X—NHCO—,

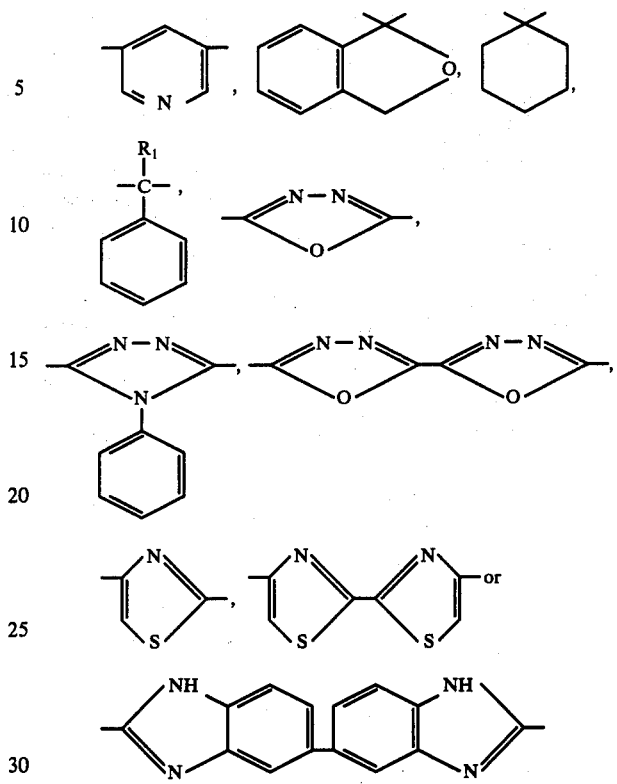

wherein $R_1$ represents a hydrogen atom, an alkyl radical with 1 to 4 carbon atoms, a phenyl radical or a cyclohexyl radical and X represents an alkylene radical with less than 13 carbon atoms.

4. The resin according to claim 3 in which A denotes:

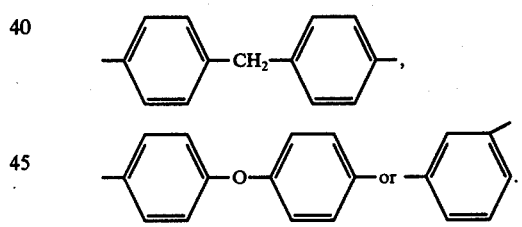

5. The resin according to claim 1 in which G denotes a phenyl radical optionally substituted by a chlorine, fluorine, methyl, methoxy or nitro group.

6. The resin according to claim 4 in which G denotes a phenyl radical.

7. The resin according to claim 5 in which T denotes an alkyl radical to 1 to 18 carbon atoms, a phenyl or cyclohexyl radical or a

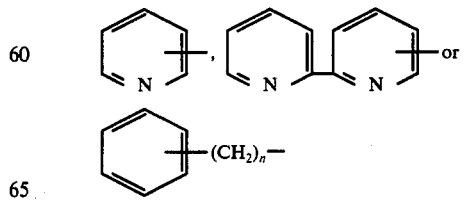

radical wherein $n$ represents an integer from 1 to 3, or a phenyl and a phenylene radical connected by a single bond or by —O—, —S—, an alkylene radical of 1 to 3 carbon atoms, —CO—, —SO$_2$—, —NR$_1$—, —N=N—, —CONH— or —COO— wherein R$_1$ is as defined in claim 23.

8. The resin according to claim 7 in which T denotes a phenyl radical.

9. The resin according to claim 1 which also comprises an aromatic compound containing 2 to 4 benzene rings which is not sublimable at atmospheric pressure up to 250° C. and which has a boiling point above 250° C.

10. The resin according to claim 9 which also comprises a terphenyl.

11. The resin according to claim 1 in which the polymerisable monomer is allyl phthalate.

12. Process for the preparation of a resin as defined in claim 1 which comprises heating at between 50° and 350° C., at least one alazine of the general formula:

in which the symbol G is as defined in claim 21 with at least one bis-imide of the general formula:

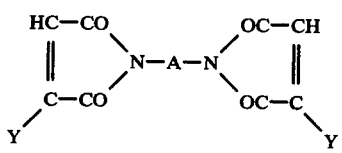

in which A and Y are as defined in claim 1, in such amounts that on average at least 2.2 and at most 10 mols of bis-imide are present per mol of alazine, and a polymerisable monomer as defined in claim 1.

13. Process according to claim 12 in which a monoimide of the general formula:

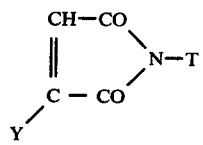

in which G, A, Y are as defined in claim 12 and T is as defined in claim 2 is heated with the alazine and bis-imide in an amount such that at most 30 mols of monoimide are present per 100 mols of bis-imide.

14. Process according to claim 12 in which a prepolymer is first prepared by heating the mixture in bulk at a temperature of between 80° and 180° C. until a homogeneous liquid is obtained and the prepolymer is then cured by subsequent heating at between 150° and 350° C.

15. Process according to claim 12 in which a prepolymer is prepared by heating the reactants in solution in a polar solvent at a temperature of between 50° and 180° C. and the prepolymer is then cured by subsequent heating at between 150° and 300° C.

16. Process according to claim 12 in which the polymerisable monomer is allyl phthalate.

17. A shapable heat curable prepolymer obtained by carrying out the first step in the process claimed in claim 14.

18. A shapable heat curable prepolymer solution obtained by carrying out the first step in the process claimed in claim 15.

* * * * *